July 20, 1954
J. C. VICKLAND
2,684,425
INDUCTION BRAZING JIG
Filed March 18, 1953
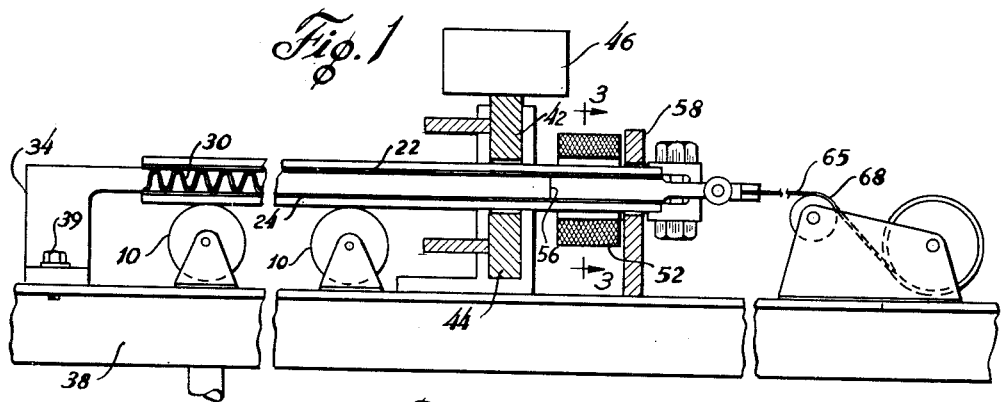
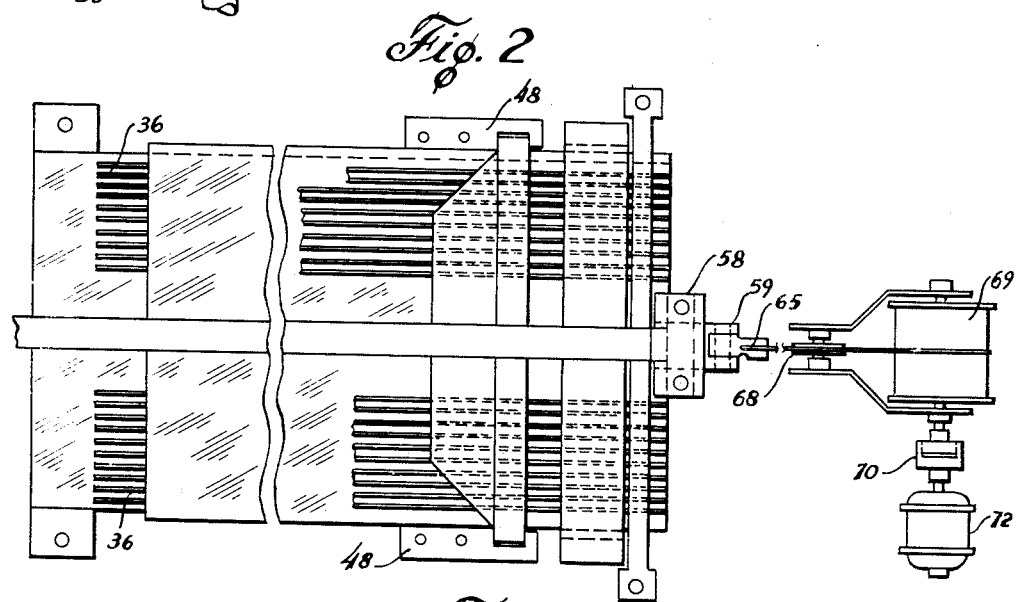
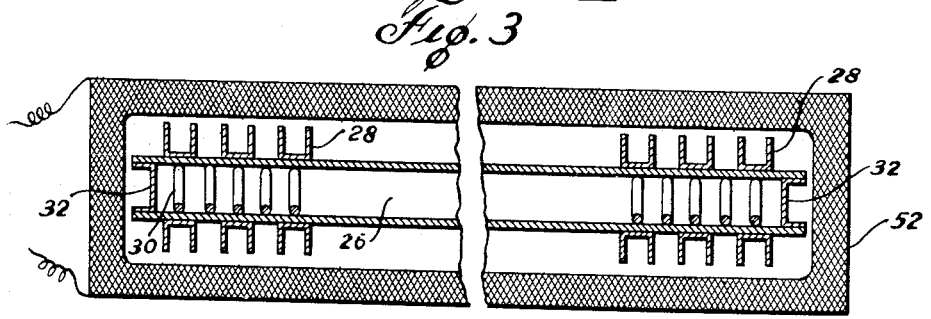
INVENTOR.
John C. Vickland
BY Patented July 20, 1954

2,684,425

UNITED STATES PATENT OFFICE 2,684,425

INDUCTION BRAZING JIG

John C. Vickland, Wellsville, N. Y., assignor to The Air Preheater Corporation, New York, N. Y.

Application March 18, 1953, Serial No. 343,074

4 Claims. (Cl. 219—4)

The present invention relates to improvements in plate type heat exchangers utilized for the transmission of heat between two confined fluids, and particularly to a novel method of assembling and brazing together by induction heating the individual elements of a plate type heat exchanger.

A plate type heat exchanger of the kind contemplated is made up of a plurality of metallic plates spaced to form passages through alternate ones of which a relatively hot fluid, such as hot gas, flows while air or other fluid to be heated traverses the intermediate passages. In many such heat exchangers a series of "envelopes" are provided consisting of parallel plates with the space there between closed along one pair of opposite edges to bound opposite sides of the passage for the heating fluid. The envelopes are mounted in spaced parallel relation to form the passages for the fluid to be heated and the space between envelopes is also closed along one pair of opposite edges. Such spaced envelopes form a core that is usually enclosed within a housing with which are associated inlet and outlet manifolds and the supply and discharge ducts for the two fluids.

To increase heat transfer efficiency of the device, the walls of the fluid passages are frequently provided with fins which project into the path of fluids and serve to increase the conduction of heat to and through the walls of the passages. Such fins sometimes take the form of parallel channels on the outer surfaces of said plates and parallel rows of sinusoidally bent wires between said plates. To promote efficient heat transfer between elements of an envelope, good bonds must be provided, and it is the intent of this invention to provide a method of brazing by which a sound bond between individual elements of an envelope is achieved.

The invention will best be understood upon consideration of the following detailed description of an illustrative embodiment thereof when read in conjunction with the accompanying drawings in which:

Figure 1 is a sectional side elevation of the device of this invention.

Figure 2 is a top plan view of the same assembly.

Figure 3 is a cross section of Figure 1 as seen on line 3—3.

Heat exchangers of the type described herein are made up of a plurality of unitary envelopes comprising metallic plates 22 and 24 mounted in spaced relation to form an air passage 26 between plates while the spaces outside the plates have longitudinal channels 28 which define fins along which the gas stream flows. To provide extended surface in the air passage 26 a plurality of parallel wires 30 sinuously bent to form U-shaped loops extend back and forth between passage walls 22, 24. Side closures 32 comprising channel members of the same width as the legs of U-shaped wires 30 and placed at the side edges of the space 26 between plates 22 and 24 to enclose said space and render it gas tight on these edges.

In order to hold the channel members 28 in position on the plates 22 and 24 during the brazing operation, they are tack welded to the outer surfaces of said plates before assembly in the brazing jig. Prior to assembly thin strips or sheets of brazing metal are placed between all elements to be bonded by brazing so that adequate brazing material is located at the exact point of usage when the envelope assembly is heated to a brazing temperature.

The first step in the brazing operation is to spotweld a series of channel members 28 to one side of each plate 22 and 24, there being a thin sheet of brazing metal placed between the channels and plate in the manner previously described. Plate 24 with its attached channels 28 is then placed on the roller bed 19 so that the channels are in contact with the roller members and the upper side of said plate presents a plane surface substantially parallel to the surface of said roller bed. The stationary finger jig 34 is then moved into position over plate 24 and bolted to the support structure 38 by bolts 39. The finger jig comprises a series of fingers 36 positioned over the plate 24 and lying parallel to the spaced channels on the under side thereof. The fingers 36 are positioned apart sufficiently to permit the sinuously bent wires 30 to be placed in the space between said fingers and held in an upright position. After moving the jig 34 into position and placing wires between each pair of fingers, the jig may be bolted to stationary floor members 38 so as to positively position said wires relative to the plates. An upper plate 22 having channels 28 tack welded thereto in the manner described for the lower plate 24 is then superimposed over the lower plate and the intervening U-shaped wires, it being understood that suitable brazing metal is inserted between both plates and the abutting sinuous wires.

Adjacent the right hand ends of fingers 36 are upper and lower comb members 42 and 44 which have a series of serrations coinciding with the spaces between channels 28. Lower comb 44 is fixed to the support structure while the upper comb member 42 is slidably mounted with respect thereto and is biased by weight 46 or an equivalent spring means into contact with an intervening envelope assembly. The upper positioning comb is maintained in alignment with the lower positioning comb 44 by means of guide members 48 fixed to support structure 38.

An electric induction heating coil 52 is positioned adjacent comb members 42 and 44 and is energized by any suitable source of electricity not here shown. The heating coil is positioned so as to completely embrace the envelope assembly as it is drawn over the rolls 10 and between the serrated edges of comb members 42 and 44. The coil 52 may be formed with an inner surface having an irregular configuration to more nearly conform to the cross section of the assembled envelope moving therethrough. It is to be noted that the coil 52 is spaced from the ends 56 of fingers 36 a distance sufficient to prevent heating thereof and thereby prevent molten brazing metal from adhering to the ends of said fingers.

A second comb type clamp 58 is positioned adjacent to the coil 52 on the side of said coil opposite the first named comb clamp 42, 44. This clamp presses the component parts of the envelope together until the molten brazing metal intermediate said parts has solidified sufficiently to bond the parts into an integral envelope.

A clamping means 59 is provided for connecting a cable 65 to the end of the envelope assembly which projects through the heating coil and between both comb clamps. Spaced outwardly from said clamping means is a guide pulley 68 directing the cable over a drum 69. Drum 69 is turned on its axis by a power drive 72 acting through a suitable coupling 70. It is apparent therefore that as the cable is rolled onto the drum, the envelope assembly is drawn through the field of the electric induction coil in such a manner as to subject it to a temperature sufficient to reduce the brazing metal intermediate envelope elements to a molten state and thus permit it to be drawn by capillarity into the spaces between said elements.

After the envelope assembly has made one pass through the induction coil the finger jig 34 may be removed and said assembly again placed on the rollers and manually moved forward past the positioning comb and through the induction coil for a distance sufficient to braze the extreme end portion of the envelope not subjected to heat from the coil on the first pass therethrough.

It may be advisable to supplement the envelope advancing mechanism as shown with a power means for rotating the rollers 10 so that an envelope assembly placed upon such rollers may be advanced from the positioning comb 42 and 44, through the induction heating coil 52 and positioning combs 58 and 59 before being attached by clamping means 59 to the cable 70. In this manner the entire envelope could be brazed in but a single pass through the heating coil.

What I claim is:

1. A brazing jig assembly for a heat exchanger envelope including a pair of metallic plates provided on their outer surfaces with longitudinally extending metallic fins and spaced apart by longitudinally extending rows of sinuous wires, said assembly comprising; a plurality of parallel roller means mounted on suitable support structure and spaced apart to provide a movable bed for said envelope assembly; an electric induction heating coil parallel to said rollers and having an opening therethrough to allow passage of an envelope assembly when advanced over said rolls; guide means adjacent said induction coil for maintaining the finned plates in alignment; a finger jig maintaining rows of sinuous wires laterally spaced between said metallic plates; and means for advancing the envelope assembly through the coil and thereby subjecting said assembly to the heat produced thereby.

2. A brazing jig assembly for a heat exchanger envelope having finned outer walls separated by parallel rows of longitudinally disposed sinuous wires; said assembly comprising a plurality of rollers providing a movable bed for said envelope assembly; a series of parallel fingers normal to said rollers for maintaining the sinuous wires in an upright position; an electric induction coil formed with an opening therethrough aligned with the movable roller bed for said envelope assembly; a positioning comb adjacent either side of said induction coil for positioning the finned plates as they are advanced through said coil; and means for advancing the envelope assembly through the induction coil.

3. A brazing jig assembly for a heat exchanger envelope having a pair of metallic plates provided on their outer surfaces with longitudinally extending metallic fins and spaced apart by longitudinally extending rows of sinuous wires, said assembly comprising; a plurality of horizontally disposed rollers mounted on suitable support structure to provide a movable bed for a horizontally disposed envelope assembly; a series of parallel fingers fixed to said support structure and extending horizontally above said rollers to maintain the sinuous wires in an upright position between the finned outer walls; an electric induction coil aligned with said rollers and disposed to permit passage of the envelope assembly therethrough; a positioning comb adjacent either side of said induction coil for positioning the finned plates as they are advanced through said coil, each positioning comb having a lower portion fixed to the support structure and an upper portion movable relative thereto; and means for moving the envelope assembly over said rollers and through the coil.

4. A brazing jig assembly for a heat exchanger envelope having a pair of metallic plates provided at their outer surfaces with longitudinally extending rows of sinuous wires, said assembly comprising; roller means mounted on suitable support structure to provide a movable bed for a horizontally disposed envelope assembly; a finger jig fixed to said support structure and extending over said roller means in a spaced relation thereto to maintain the sinuous wires in an upright position; an electric induction coil aligned with said roller means and disposed to permit passage of the envelope assembly therethrough; a serrated positioning comb adjacent either side of said induction coil for positioning the finned plates as they are advanced over said roller means and through said coil, each positioning comb having a lower portion fixed to the support structure and an upper portion biased toward said lower portion; and means for advancing the envelope assembly over the roller means and through the coil.

No references cited.